Figure 1:
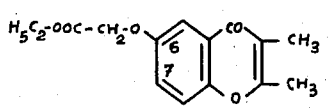
Figure 2:
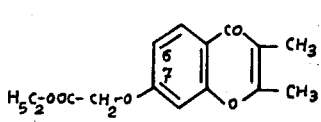
Figure 3:
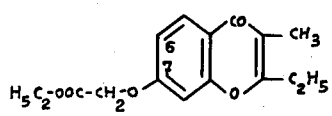
Figure 4:
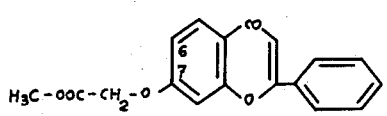
Figure 5:
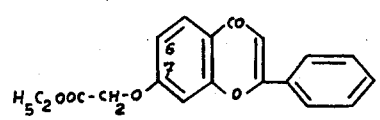

July 28, 1959 P. DA RE 2,897,211
HYDROXYCHROMONE DERIVATIVES AND METHOD OF PREPARING THE SAME
Filed Oct. 30, 1956 4 Sheets-Sheet 1

July 28, 1959 P. DA RE 2,897,211
HYDROXYCHROMONE DERIVATIVES AND METHOD OF PREPARING THE SAME
Filed Oct. 30, 1956 4 Sheets-Sheet 3

2,897,211

HYDROXYCHROMONE DERIVATIVES AND METHOD OF PREPARING THE SAME

Paolo Da Re, Milan, Italy, assignor to Dr. Recordati-Laboratorio Farmacologico S.p.A., Milan, Italy Application October 30, 1956, Serial No. 619,313

Claims priority, application Italy November 2, 1955

8 Claims. (Cl. 260—345.2)

Those who are giving themselves up to pharmacological problems find often in nature starting points and grounds upon which they will found chemico-biological researches of a high interest for the type of disease that they are endeavouring to cure.

The active principle of the *Ammi visnaga* fruit which is the "kellin" or chemically: 2-methyl-5,8-dimethoxy-6,7-(2',3'-furano)-chromone, and was initially used by peoples in the Middle East as a diuretic and an anti-spasmodic, has served as an example in the search for drugs having a coronaro-dilating activity.

The first studies on this subject dated to 1950 and included works by G. V. Anrep, G. S. Barsoum, M. R. Kenawy (J. Pharm. Pharmacol. 1, 164, 1949); A. Schönberg, A. Sina (J.A.C.S. 72, 1611, 1950); G. V. Anrep, A. Schönberg (J. Pharm. Pharmacol. 6, 166, 1953); Schmutz et al. (Helv. Chim. Acta 34, 767, 1951; 35, 1168, 1952; 36, 620, 1953). There must be particularly pointed out the work of G. Jongebreur (Pharm. Weekblad 86, 661, 1951) (Arch. Int. Pharmacodyn. 90, 384, 1952) who had systematically studied the nucleus of the chromone and that of the flavone, enabling to bring out some of the characteristics that the molecule must present in order to show a coronaro-dilating activity.

It has now been found that the chromone and flavone nuclei have by themselves a certain activity and it has been endeavoured to find the organic function which, when introduced into said nuclei, will be able to exalt their coronaro-dilating activity.

After a preliminary selection of the various compounds synthetically obtained, attention has been directed to the chromone nucleus of the following type:

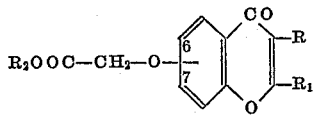

i.e. a 6 or 7 oxyacetic-substituted molecule; said oxyacetic chain can also assume the form of a furane cycle.

The results of biological experimentation have confirmed the hopes thus grounded on these products.

The compounds with which the present invention is concerned have been experimented as coronarodilators on an isolated rabbit's heart and on a dog's heart in situ according to the technique of Morawitz and they have all shown a remarkable activity, substantially higher than that of the "kellin" as well as a lower toxicity.

Following pharmacological tests in biological laboratories, some of the most active products have been subjected to clinical experimentation and they are giving interesting results.

The data relating to the activity of some of the products concerned have been grouped in the following Table I:

TABLE I

| | Activity |
|---|---|
| 2,3-dimethylchromone-6-ethyl oxyacetate | + + |
| 2,3-dimethylchromone-7-ethyl oxyacetate | + + |
| 2-ethyl-3-methylchromone-7-ethyl oxyacetate | + + |
| Flavone-7-methyl oxyacetate | + + |
| Flavone-7-ethyl oxyacetate | + + |
| Flavone-7-propyl oxyacetate | + + |
| Flavone-7-isopropyl oxyacetate | + + |
| Flavone-7-butyl oxyacetate | + + |
| Potassium salt of 2,3-dimethylchromone-6-oxyacetic acid | + |
| Potassium salt of 2-ethyl-3-methylchromone-7-oxyacetic acid | + |
| Potassium salt of 2,3-dimethylchromone-7-oxyacetic acid | + |
| Potassium salt of flavone-7-oxyacetic acid | + |
| 2,3 - dimethylchromone - 7 - beta - diethyl - aminoethyl oxyacetate hydrochloride | + |
| 2,3 - dimethylchromone - 6 - beta - diethyl - aminoethyl oxyacetate hydrochloride | + |
| 2 - ethyl - 3 - methylchromone - 7 - beta - diethylaminoethyl oxyacetate hydrochloride | + |
| Flavone-7-beta-dimethylaminoethyl oxyacetate hydrochloride | + |
| Flavone-7-beta-diethylaminoethyl oxyacetate hydrochloride | + |
| Flavone-7-beta-piperidinoethyl oxyacetate hydrochloride | + | wherein activity: += equal to "kellin"; + += higher than "kellin."

Figure 34:
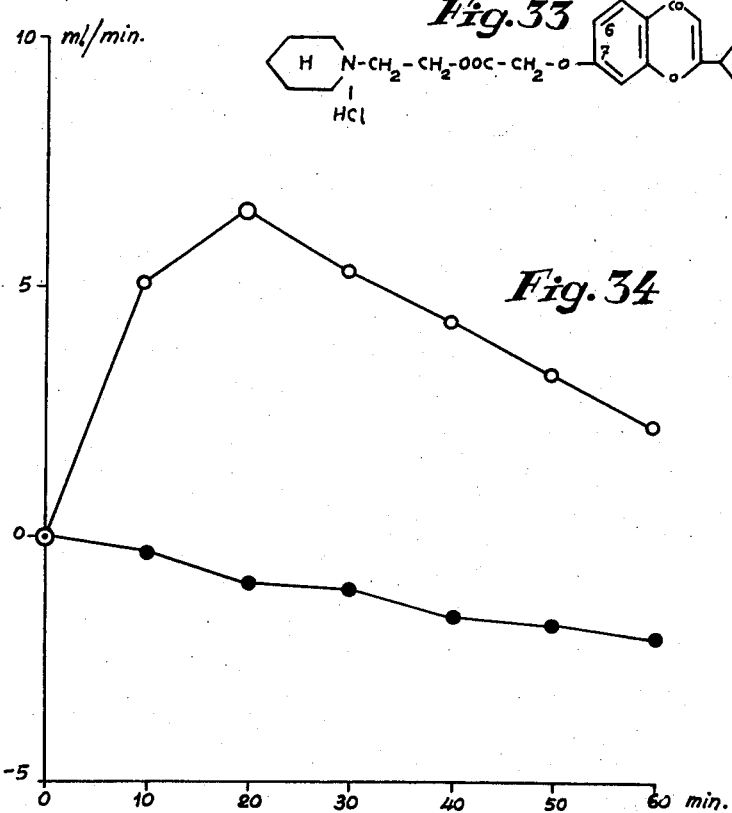

A substance which is particularly remarkable for its high activity is flavone-7-ethyl oxyacetate which, at a concentration of 3.16 mg./l., in a Ringer-Locke solution, is able to increase the coronary flux by 80%, as can be seen on the diagram of Fig. 34 of the accompanying drawing, in which the time of perfusion has been noted in abscissae and the increase of the coronary flux in cm.³/mn. in ordinates. In this diagram, the upper curve relates to the flavone-7-ethyl oxyacetate and the lower curve to the Ringer-Locke solution.

The toxicity is likewise very low: the $LD_{50}$ through the intraperitoneal way is 3,300 mg./kg. in the rat.

The compounds prepared according to the invention have the structural formula as follows:

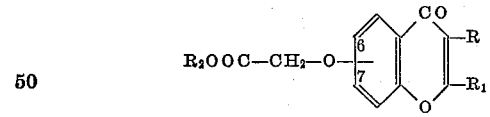

wherein R and $R_1$ stand both as a $CH_3$ group, the oxyacetic chain —O—$CH_2$—COO—$R_2$ will be in position 6 or 7 of the chromone nucleus and $R_2$ will represent H, Na, K, $C_2H_5$,

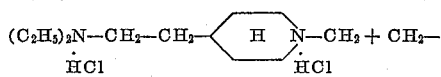

On the other hand, when R represents a $CH_3$ group and $R_1$ represents a $C_2H_5$ group, the oxyacetic chain

—O—$CH_2$—COO—$R_2$ will be in position 7 of the chromone nucleus and $R_2$ will represent H, Na, K, $C_2H_5$

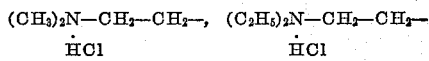

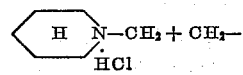

Moreover, when R represents H and $R_1$ represents a $C_6H_5$ group, the oxyacetic chain —O—$CH_2$—COO—$R_2$ will be fixed in position 7 of the chromone nucleus and $R_2$ will represent H, Na, K or an alkyl radical of from 1 to 6 carbon atoms, or alternatively

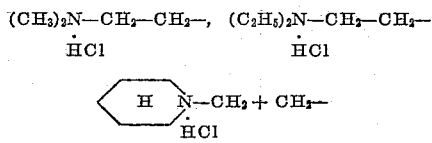

The preparation of the compounds concerned comprises reacting a 6 or a 7 substituted hydroxychromone in suspension in acetone with an alkyl-haloacetate in which the alkyl radical may include from 1 to 6 carbon atoms, and in the presence of an alkaline carbonate, at the boiling temperature of the solution and throughout a predetermined time interval, then recuperating the solvent used in the condensation, taking up the residue in water, drying and recrystallizing the same in an adequate solvent until alkyl esters corresponding to the general formula above disclosed are obtained.

By alkalin alcoholic hydrolysis of any of the esters in question, there are obtained the corresponding alkali metal salts of the 6 or 7 substituted chromonoxyacetic acids. The operation is performed by separating the alkali salt obtained, washing it with alcohol and drying it.

By acid hydrolysis of any of the above cited esters, there are obtained on the other hand chromone 6 or chromone 7 substituted oxyacetic acids. By condensing an alkali salt of one of these acids in an adequate solvent with dimethylaminoethyl chloride hydrochloride or diethylaminoethyl chloride hydrochloride, or with piperidinoethyl chloride hydrochloride, at the boiling temperature of the solution, for a predetermined time interval, hot filtrating the residue in suspension, cooling the filtrate down to 0° C., separating the solid precipitate and recrystallizing the same in an adequate solvent, there are obtained basic esters soluble in water of the chromone 6 or chromone 7 substituted oxyacetic acids.

The invention will be better understood with reference to the following examples of practical application of the process according to the invention, as well as to the accompanying drawing in which Figures 1 to 33 illustrate structural formulas of the compounds prepared in accordance with the invention.

*Example 1*

2,3-DIMETHYLCHROMONE-6-ETHYL OXYACETATE
(FIG. 1)

In a glass balloon having a volume of 500 cm.³ and equipped with a bulb cooler with a $CaCl_2$ closure, there are placed 200 cm.³ anhydrous acetone and 8.5 g. ethyl bromacetate. To this solution are added 9.5 of 6-hydroxy-2,3-dimethylchromone and 5 g. $K_2CO_3$. There is thus obtained a suspension that is boiled at reflux in a water-bath for 7 hours without a complete dissolution being ever obtained. In this manner, the 6-hydroxy-2,3-dimethylchromone condenses with ethyl bromacetate, yielding 2,3-dimethyl-6-ethyl chromonoxyacetate. The bulb cooler is replaced on the balloon by an extension for simple distillation, and the content is concentrated till it is dry. In this manner the solvent is recovered by approximately 85%. The residue in the balloon is in the form of a defined solid having a dirty-white colour; it is then washed in water and filtered on a Büchner funnel. In this manner there are eliminated a portion of the potassium carbonate and the potassium bromide formed during the reaction. The cake collected on the filter is carefully washed in water and dried in an autoclave at 90° C. 8 g. of product having a melting point of 100.5–102.5° are thus obtained.

*Analysis.*—Calculated for $C_{15}H_{16}O_5$: C, 25.21%; H, 5.79%. Effective: C, 65.50%; H, 5.70%.

*Example 2*

2,3-DIMETHYLCHROMONE-7-ETHYL OXYACETATE
(FIG. 2)

In a glass balloon having a capacity of 500 cm.³ and equipped with a bulb cooler with a $CaCl_2$ closure, there are placed 200 cm.³ anhydrous acetone and 8.7 g. ethyl bromacetate. To this solution are added 10 g. 7-hydroxy-2,3-dimethylchromone and 10 g. $K_2CO_3$. There is thus obtained a suspension that is boiled at reflux in a water-bath for 7 hours without a complete dissolution being ever obtained. In this manner, the 7-hydroxy-2,3-dimethylchromone condenses with ethyl bromacetate thus yielding 2,3-dimethylchromone-7-ethyl oxyacetate. In the balloon the bulb cooler is replaced by an extension for simple distillation and the content is concentrated until it is dry. In this manner the solvent is recovered by approximately 85%. The residue in the balloon is in the form of a defined solid having a dirty-white colour; it is placed in water and then filtered on a Büchner funnel. In this manner, there are eliminated a portion of the potassium carbonate, and the potassium bromide formed during the reaction. The cake collected on the filter is carefully washed in water and dried in an autoclave at 100° C. There are thus obtained 14 g. of a crude product that is recrystallized in ethylic alcohol at 50%, which yields 12 g. of product having a melting point of 123–125° C.

*Analysis.*—Calculated for $C_{15}H_{16}O_5$: C, 65.21%; H, 5.79%. Effective: C, 65.18%; H, 5.60%.

*Example 3*

2-ETHYL-3-METHYLCHROMONE-7-ETHYL OXYACETATE
(FIG. 3)

In a glass balloon having a capacity of 500 cm.³ equipped with a bulb cooler with a $CaCl_2$ closure, are placed 200 cm.³ anhydrous acetone and 8.2 g. ethyl bromacetate. To this solution are added 10 g. 7-hydroxy-2-ethyl-3-methylchromone and 10 g. $K_2CO_3$. There is thus obtained a suspension that is boiled at reflux in a water-bath for 7 hours without a complete dissolution being ever reached. In this manner, the 7-hydroxy-2-ethyl-3-methylchromone condenses with the ethyl bromacetate thus yielding 2-ethyl-3-methylchromone-7-ethyl oxyacetate.

In the balloon the bulb cooler is replaced by an extension for simple distillation and the content is concentrated until it is dry. The solvent is thus recovered by approximately 85%. The residue in the balloon is in the form of a defined solid having a dirty-white colour; it is placed in water and then filtered on a Büchner funnel. In this manner there are eliminated a portion of the potassium carbonate and the potassium bromide formed during the reaction.

The cake collected on the filter is carefully washed in water and dried in an autoclave at 50° C. There are obtained 12.5 g. of product which is recrystallized in a mixture of petroleum ether and ligroine, whereby 11 g. of product having a melting point of 87–89° C. are obtained.

*Analysis.*—Calculated for $C_{16}H_{18}O_5$: C, 66.21%; H, 6.20%. Effective: C, 66.51%; H, 6.51%.

*Example 4*

FLAVONE-7-METHYL OXYACETATE (FIG. 4)

In a glass balloon having a capacity of 500 cm.³ equipped with a bulb cooler with a $CaCl_2$ closure, are placed 200 cm.³ anhydrous acetone and 4.6 methyl chloracetate. To this solution are added 10 g. of 7-hydroxyflavone and 10 g. $K_2CO_3$. The suspension thus obtained is boiled at reflux in a water-bath for 7 hours, without a complete solution being ever obtained. In this manner, the 7-hydroxyflavone condenses with the methyl chloracetate thus yielding flavone-7-methyl oxyacetate.

In the balloon the bulb cooler is replaced by an extension for simple distillation and the content is concentrated until it is dry. The solvent is thus recovered by approximately 85%.

The residual in the balloon is in the form of a defined solid having a yellowish colour; it is placed in water and then filtered on a Büchner funnel. In this manner a portion of the potassium carbonate and the potassium chloride formed during the reaction are eliminated.

The cake collected on the filter is carefully washed in water and dried in an autoclave at 100° C. There are thus obtained 6.3 g. of product that are recrystallized in absolute alcohol, thus yielding 4 g. of product having a melting point of 134–135° C.

*Analysis.*—Calculated for $C_{18}H_{14}O_5$: C. 69.66%; H, 4.54%. Effective: C, 69.72%; H, 4.36%.

*Example 5*

FLAVONE-7-ETHYL OXYACETATE (FIG. 5)

In a glass balloon having a capacity of 500 cm.$^3$ equipped with a bulb cooler with a $CaCl_2$ trap, are placed 200 cm.$^3$ anhydrous acetone and 2.7 g. ethyl chloracetate. To this solution are added 5 g. of 7-hydroxyflavone and 5 g. of $K_2CO_3$; the suspension so obtained is refluxed in a water bath for 7 hours without a complete dissolution being ever obtained. In this manner, the 7-hydroxyflavone condenses with the ethyl chloracetate thus yielding flavone-7-ethyl oxyacetate.

In the balloon the bulb cooler is replaced by a simple distillation extension and the content is concentrated until it is dry. The solvent is thus recovered by approximately 85%. The residual in the balloon is in the form of a well-defined solid having a dirty-white colour; it is taken up in water and then filtered in a Büchner funnel. In this manner, a part of the potassium carbonate and the potassium chloride formed during the reaction are eliminated.

The cake collected on the filter is carefully washed in water and then dried in an autoclave at 100° C. There are thus obtained 5 g. of product that are recrystallized in ethylic alcohol at 50%, thus yielding 4.5 g. of product with a melting point of 123–124° C.

*Analysis.*—Calculated for $C_{19}H_{16}O_5$: C, 70.37%; H, 4.93%. Effective: C, 70.58%; H, 5.04%.

*Example 6*

Figure 6:
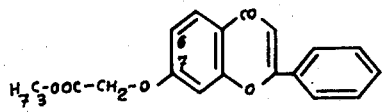
Figure 7:
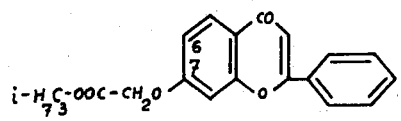
Figure 8:
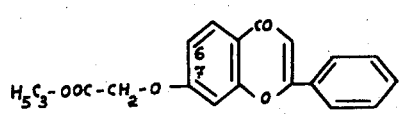
Figure 9:
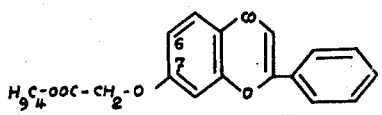
Figure 10:
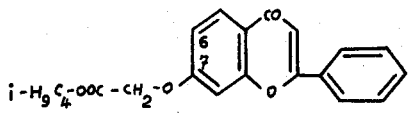
Figure 11:
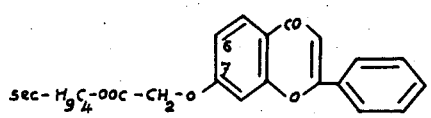
Figure 16:
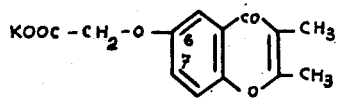
Figure 12:
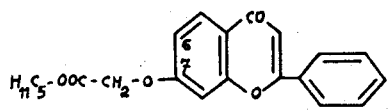
Figure 17:
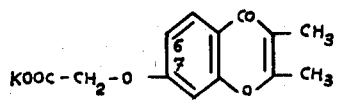
Figure 13:
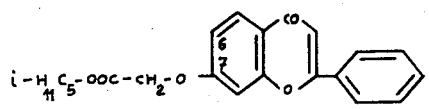
Figure 18:
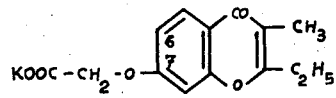
Figure 14:
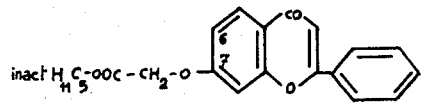
Figure 19:
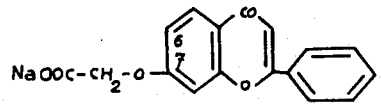
Figure 15:
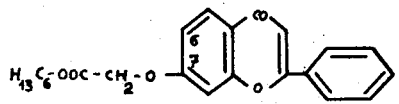
Figure 20:
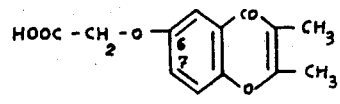

FLAVONE-7-n-PROPYL OXYACETATE (FIG. 6)

In a glass balloon having a capacity of 500 cm.$^3$, equipped with a bulb cooler with a $CaCl_2$ trap, are placed 200 cm.$^3$ anhydrous acetone and 4.6 g. n-propyl chloracetate. To this solution are added 4.5 g. of 7-hydroxyflavone and 4.5 g. of $K_2CO_3$. The suspension so obtained is refluxed in a water bath for 7 hours, without a complete dissolution being ever reached. In this manner, the 7-hydroxyflavone condenses with the n-propyl chloracetate thus yielding flavone-7-n-propyl-oxyacetate.

In the balloon the bulb cooler is replaced by a simple distillation extension and the content is concentrated to dryness. The solvent is thus recovered by approximately 85%. The residual in the balloon is in the form of a well-defined solid having a yellow colour; it is taken up in water and then filtered in a Büchner funnel. In this manner part of the potassium carbonate and the potassium chloride formed during the reaction are eliminated.

The cake collected in the filter is carefully washed in water and dried in an autoclave at 100° C. There are thus obtained 8.5 g. of crude product which are recrystallized in absolute alcohol; 8.5 g. of a yellow crystalline solid with a melting point of 165–168° C. are obtained.

*Analysis.*—Calculated for $C_{20}H_{18}O_5$: C, 71.00%; H, 5.32%. Effective: C, 71.55%; H, 4.93%.

*Example 7*

FLAVONE-7-ISOPROPYL OXYACETATE (FIG. 7)

In a glass balloon with a capacity of 500 cm.$^3$ equipped with a bulb cooler with a $CaCl_2$ trap are placed 200 cm.$^3$ anhydrous acetone and 3.7 isopropyl chloracetate. To this solution are added 6.5 g. of 7-hydroxyflavone and 6.5 g. of $K_2CO_3$. The suspension so obtained is refluxed in a waterbath for 7 hours without a complete solution being ever reached. In this manner, the 7-hydroxyflavone condenses with the isopropyl chloracetate thus yielding flavone-7-isopropyl oxyacetate. In the balloon the bulb cooler is replaced by a simple distillation extension and the content is concentrated to dryness. The solvent is thus recuperated by approximately 85%. The residual in the balloon is in the form of a well-defined solid having a light-yellow colour; it is taken up in water and filtered in a Büchner funnel. In this manner, part of the potassium carbonate and the potassium chloride formed during the reaction are eliminated.

The cake collected in the filter is carefully washed in water and dried in an autoclave at 100° C. There are thus obtained 7 g. of product which are recrystallized in absolute alcohol, thus yielding 4.4 g. of product with a melting point of 115–116° C.

*Analysis.*—Calculated for $C_{20}H_{18}O_5$: C, 70.93%; H. 5.38%. Effective: C, 70.73%; H, 5.19%.

*Example 8*

FLAVONE-7-ALLYL OXYACETATE (FIG. 8)

In a glass balloon having a capacity of 500 cm.$^3$ equipped with a bulb cooler with a $CaCl_2$ trap, are placed 200 cm.$^3$ anhydrous acetone and 5.38 g. allyl chloracetate. To this solution are added 10 g. of 7-hydroxyflavone and 10 g. of $K_2CO_3$. The suspension so obtained is refluxed in a water-bath for 7 hours without a complete solution being ever reached. In this manner the 7-hydroxyflavone condenses with the allyl chloracetate, thus yielding flavone-7-allyl oxyacetate.

In the balloon, the bulb cooler is replaced by a simple distillation extension and the content is concentrated to dryness. The solvent is thus recuperated by approximately 85%. The residual in the balloon is in the form of a well-defined solid having a dirty-white colour; it is taken up in water and filtered in a Büchner funnel. In this manner part of the potassium carbonate and the potassium chloride formed during the reaction are eliminated. The cake collected in the filter is carefully washed in water and dried in an autoclave at 100° C. There are thus obtained 10 g. of crude product which are recrystallized in ethylic alcohol; 5 g. of a white crystalline solid are obtained with a melting point of 118–119° C.

*Analysis.*—Calculated for $C_{20}H_{16}O_5$: C, 71.42%; H. 4.79%. Effective: C, 70.6%; H, 4.69%.

*Example 9*

FLAVONE-7-SECONDARY BUTYL OXYACETATE (FIG. 11)

In a glass balloon having a capacity of 500 cm.$^3$ equipped with a bulb cooler with a $CaCl_2$ trap are placed 200 cm.$^3$ anhydrous acetone and 6.3 g. secondary butyl chloracetate. To this solution are added 10 g. 7-hydroxyflavone and 10 g. $K_2CO_3$. The suspension so obtained is refluxed in a water bath for 7 hours, without a complete dissolution being ever reached.

In this manner, the 7-hydroxyflavone condenses with the secondary butyl chloracetate yielding flavone-7-secondary butyl oxyacetate.

In the balloon the bulb cooler is replaced by a simple distillation extension and the content is concentrated to dryness. The solvent is thus recuperated by approximately 85%. The residual in the balloon is in the form of a well-defined solid having a dirty-white colour; it is taken up in water and then filtered in a Büchner funnel. In this manner part of the potassium carbonate and the potassium chloride formed during the reaction are eliminated.

The cake collected in the filter is carefully washed in water and dried in an autoclave at 50° C. There are thus obtained 10 g. of product that is recrystallized in ligroine. 7 g. of a white crystalline solid with a melting point of 95–96° C. are obtained.

*Analysis.*—Calculated for $C_{21}H_{20}O_5$: C, 71.57%; H, 5.72%. Effective: C, 70.08%; H, 5.69%.

Example 10

FLAVONE-7-ISOBUTYL OXYACETATE (FIG. 10)

In a glass balloon having a capacity of 500 cm.$^3$ equipped with a bulb cooler with a $CaCl_2$ trap are placed 200 cm.$^3$ anhydrous acetone and 6.3 g. isobutyl chloracetate. To this solution are added 10 g. of 7-hydroxyflavone and 10 g. of $K_2CO_3$. The suspension so obtained is refluxed in a water bath for 7 hours without a complete dissolution being ever reached.

In this manner, the 7-hydroxy-flavone condenses with the isobutyl chloracetate thus yielding flavone-7-isobutyl oxyacetate.

In the balloon, the bulb cooler is replaced by an extension for simple distillation and the content is concentrated to dryness. The solvent is thus recuperated by approximately 85%. The residual in the balloon is in the form of a well-defined solid having a dirty-white colour; it is taken up in water and filtered in a Büchner funnel. In this manner, part of the potassium carbonate and the potassium chloride formed during the reaction are eliminated.

The cake collected in the filter is carefully washed in water and dried in an autoclave at 70° C. There are thus obtained 10 g. of a product which is recrystallized in ligroine thus yielding 9 g. of a white crystalline solid with a melting point of 93–95° C.

*Analysis.*—Calculated for $C_{21}H_{20}O_5$: C, 71.57%; H, 5.72%. Effective: C, 72.00%; H, 5.65%.

Example 11

FLAVONE-7-BUTYL OXYACETATE (FIG. 9)

In a glass balloon having a capacity of 500 cm.$^3$ equipped with a bulb cooler with a $CaCl_2$ trap are placed 200 cm.$^3$ anhydrous acetone and 5.7 g. butyl chloroacetate. To this solution are added 9 g. of 7-hydroxyflavone and 9 g. of $K_2CO_3$. The suspension so obtained is refluxed in a steam bath for 7 hours without a complete dissolution being ever reached. In this manner, the 7-hydroxyflavone condenses with the butyl chloroacetate, thus yielding flavone-7-butyl oxyacetate. In the balloon the bulb cooler is replaced by a simple distillation extension and concentrated to dryness. The solvent is thus recovered by approximately 85%. The residual in the balloon is in the form of a well defined solid having a dirty-yellow colour; it is taken up in water and filtered in a Büchner funnel. In this manner part of the potassium carbonate and the potassium chloride formed during the reaction are eliminated.

The cake collected on the filter is carefully washed in water and dried in an autoclave at 70° C. There are obtained 11 g. of product which are recrystallized in acetone, thus yielding 7.8 g. of a yellowish crystalline solid having a melting point of 97–99° C.

*Analysis.*—Calculated for $C_{21}H_{20}O_5$: C, 71.57%; H, 5.72%. Effective: C, 70.86%; H, 5.55%.

Example 12

FLAVONE-7-AMYL OXYACETATE (FIG. 12)

In a glass balloon having a capacity of 500 cm.$^3$ equipped with a bulb cooler with a $CaCl_2$ trap are placed 200 cm.$^3$ of anhydrous acetone and 6.9 g. of amyl chloroacetate. To this solution are added 10 g. of 7-hydroxyflavone and 10 g. of $K_2CO_3$. The suspension so obtained is refluxed in a steam bath for 7 hours without a complete dissolution being ever obtained. In this manner, the 7-hydroxyflavone condenses with the amyl chloracetate thus yielding flavone-7-amyl oxyacetate. On the balloon the bulb cooler is replaced by a simple distillation extension and the content is concentrated to dryness. The solvent is thus recuperated by approximately 85%. The residual in the balloon is in the form of a well-defined solid having a dirty-white colour; it is taken up in water and filtered in a Büchner funnel. Thus part of the potassium carbonate and the potassium chloride formed during the reaction are eliminated.

The cake collected on the filter is washed in water and dried in an autoclave at 70° C. There are thus obtained 10 g. of a crude product which is recrystallized in ligroine; 6.5 g. of a white crystalline solid with a melting point of 84–86° C. are obtained.

*Analysis.*—Calculated for $C_{22}H_{22}O_5$: C, 72.11%; H, 6.05%. Effective: C, 72.01%; H, 5.98%.

Example 13

FLAVONE-7-ISOAMYL OXYACETATE (FIG. 13)

In a glass balloon having a capacity of 500 cm.$^3$ equipped with a bulb cooler with a $CaCl_2$ trap are placed 200 cm.$^3$ anhydrous acetone and 6.5 isoamyl chloracetate. To this solution are added 10 g. of 7-hydroxyflavone and 10 g. of $K_2CO_3$. The suspension so obtained is refluxed in a steam bath for 7 hours without a complete solution being ever reached. In this manner, the 7-hydroxyflavone condenses with the isoamyl chloracetate thus yielding flavone-7-isoamyl oxyacetate.

On the balloon the bulb cooler is replaced by a simple distillation extension and the content is concentrated to dryness. The solvent is thus recuperated by approximately 85%. The residual in the balloon is in the form of a well-defined solid having a dirty-white colour; it is taken up in water and filtered in a Büchner funnel. Thus, part of the potassium carbonate and the potassium chloride formed during the reaction are eliminated. The cake collected in the filter is washed in water and dried in an autoclave at 50° C.

There are thus obtained 9.5 g. of a crude product which is recrystallized in ligroine yielding 7 g. of a white crystalline product having its melting point at 66–68° C.

*Analysis.*—Calculated for $C_{22}H_{22}O_5$: C, 72.11%; H, 6.05%. Effective: C, 71.88%; H, 5.95%.

Example 14

FLAVONE-7-INACTIVE AMYL OXYACETATE (FIG. 14)

In a glass balloon having a capacity of 500 cm.$^3$ equipped with a bulb cooler with a $CaCl_2$ trap are placed 200 cm.$^3$ of anhydrous acetone and 6.9 g. of inactive amyl chloracetate. To this solution are added 10 g. of 7-hydroxy-flavone and 10 g. of $K_2CO_3$. The suspension so obtained is refluxed in a steam bath for 7 hours without a complete dissolution being ever reached. In this manner, the 7-hydroxyflavone condenses with the inactive amyl chloracetate thus yielding the flavone-7-inactive amyl oxyacetate.

On the balloon the bulb cooler is replaced by a simple distillation extension and the content is concentrated to dryness. The solvent is thus recovered by approximately 85%. The residual in the balloon is in the form of a well-defined solid having a dirty-white colour; it is taken up in water and then filtered in a Büchner funnel. Thus part of the potassium carbonate and the potassium chloride formed during the reaction are eliminated. The cake collected on the filter is carefully washed in water and dried in an autoclave at 100° C. There are thus obtained 12 g. of a crude product which is recrystallized in ligroine; 8 g. of white crystalline solid having its melting point at 108–110° C. are obtained.

*Analysis.*—Calculated for $C_{22}H_{22}O_5$: C, 72.11%; H, 6.05%. Effective: C, 72.08%; H, 5.97%.

Example 15

FLAVONE-7-HEXYL OXYACETATE (FIG. 15)

In a glass balloon having a capacity of 500 cm.³ equipped with a bulb cooler with a $CaCl_2$ trap are placed 200 cm.³ anhydrous acetone and 7.5 g. hexyl chloracetate. To this solution are added 10 g. of 7-hydroxyflavone and 10 g. of $K_2CO_3$. The suspension so obtained is refluxed in a steam bath for 7 hours without a complete dissolution being ever reached. Thus, the 7-hydroxyflavone condenses with hexyl chloracetate, yielding flavone-7-hexyl oxyacetate.

On the balloon, the bulb cooler is replaced by a simple distillation extension and the content is concentrated to dryness. The solvent is thus recovered by approximately 85%. The residual in the balloon is in the form of a well-defined solid having a dirty-white colour; it is taken up in water and filtered in a Büchner funnel. Thus, part of the potassium carbonate and the potassium chloride formed during the reaction are eliminated. The cake collected on the filter is carefully washed in water and dried in the autoclave at 40° C. There are thus obtained 7 g. of crude product which are recrystallized in ligroin, yielding 3.5 g. of a white crystalline solid having its melting point at 53–56° C.

*Analysis.*—Calculated for $C_{23}H_{24}O_5$: C, 72.61%; H, 6.36%. Effective: C, 72.12%; H, 6.31%.

Example 16

2,3-DIMETHYLCHROMONE-6-POTASSIUM OXYACETATE (FIG. 16)

In a 250 cm.³ balloon with one pipe, equipped with a bulb cooler, are introduced 100 g. absolute ethylic alcohol and there are dissolved therein while hot 10 g. of 2,3-dimethyl-chromone-7-ethyl oxyacetate. The temperature of the solution is then allowed to cool down to 40° C. and 31 cm.³ of alcoholic KOH at 6.3% are subsequently added thereto. The bulb cooler is replaced by a stopper and the balloon is strongly agitated for from 5 to 10 minutes; then it is allowed to rest in a refrigerator for one night. The potassium salt of the 2,3-dimethylchromone-6-oxyacetic acid separates thus under the form of a white solid; it is filtered in a Büchner funnel, washed with a small quantity of alcohol and dried in an autoclave at 100° C. 10 g. of a white solid, very easily soluble in water, are obtained.

*Analysis.*—Potassium titration 101.0%.

Example 17

2,3-DIMETHYLCHROMONE-7-POTASSIUM OXYACETATE (FIG. 17)

In a one-pipe balloon of 250 cm.³, equipped with a bulb cooler, there are introduced 100 cm.³ absolute ethylic alcohol and 10 g. of 2,3-dimethylchromone-7-ethyl oxyacetate are dissolved therein while hot. The temperature of the solution is allowed to cool down to 40° C. then 31 cm.³ of alcoholic KOH at 6.3% are added thereto. The bulb cooler is replaced by a stopper and the flask is energetically agitated for from 5 to 10 minutes, then it is allowed to rest for one night in a refrigerator. The potassium salt of the 2,3-dimethylchromone-7-oxyacetic acid separates thus under the form of a white solid; it is filtered in a Büchner funnel, washed with a small quantity of alcohol and dried in an autoclave at 100° C. 9 g. of a dirty-white solid, very easily soluble in water are obtained.

*Analysis.*—Potassium titration: 101.0%.

Example 18

2-ETHYL-3-METHYLCHROMONE-7-POTASSIUM OXYACETATE (FIG. 18)

Into a 250 cm.³ one-pipe flask, equipped with a bulb cooler, there are introduced 100 cm.³ absolute ethylic alcohol, and 24 g. of 2-ethyl-3-methylchromone-7-ethyl oxyacetate are dissolved therein while hot. The temperature of the solution is allowed to cool down to 40° C., then 70 cm.³ of alcoholic KOH at 6.52% are added thereto. The bulb cooler is replaced by a stopper and the flask is energetically agitated for from 5 to 10 minutes; then it is allowed to rest in a refrigerator for one night. The potassium salt of the 2-ethyl-3-methylchromone-7-oxyacetic acid separates thus under the form of a white solid; it is filtered in a Büchner funnel, washed with a small quantity of alcohol and dried in an autoclave at 100° C. 16.5 g. of a white solid very easily soluble in water, are obtained.

*Analysis.*—Potassium titration: 99.7%.

Example 19

FLAVONE-7-SODIUM OXYACETATE (FIG. 19)

Into a one-pipe flask of 500 cm.³, equipped with a bulb cooler, there are introduced 300 cm.³ absolute ethylic alcohol and 16.2 g. of flavone-7-ethyl oxyacetate are dissolved therein in a hot state. The temperature of the solution is allowed to cool down to 40° C., then 450 cm.³ of an alcoholic solution of sodium ethylate at 2.3% are added thereto. The bulb cooler is replaced by a stopper and the flask is energetically agitated for from 5 to 10 minutes, then it is allowed to rest in a refrigerator for the night. The sodium salt of the flavone-7-oxyacetic acid separates thus in the form of a white solid. It is filtered in a Büchner funnel, washed with a small quantity of alcohol and dried in the autoclave at 100° C. 14 g. of a white solid easily soluble in water are obtained.

*Analysis.*—Sodium titration: 98.5%

Example 20

2,3-DIMETHYLCHROMONE-6-OXYACETIC ACID (FIG. 20)

Into a one-pipe 500 cm.³ flask, equipped with a bulb cooler there are placed 3 g. of 2,3-dimethylchromone-6-ethyl oxyacetate, and 25 cm.³ of $H_2SO_4$ at 70% are added thereto. The mixture is refluxed during 2 hours and a clear solution is finally obtained. The hydrolysis product is isolated by pouring the content of the flask into ice-cold water. The solid separated is then filtered and washed with water. 2.8 g. of crude product are obtained. This product is recrystallized in boiling water and there is obtained 1.7 g. of a crystalline white solid having its melting point at 184–182° C.

*Analysis.*—Acidimetric titration: 97.3%.

Example 21

2,3-DIMETHYLCHROMONE-7-OXYACETIC ACID (FIG. 21)

Into a one-pipe 50 cm.³ flask, equipped with a bulb cooler, there are introduced 6 g. of 2,3-dimethylchromone-7-ethyl oxyacetate, and 25 cm.³ of $H_2SO_4$ at 70% are added thereto. The mixture is refluxed for 2 hours and a clear solution is finally obtained. The hydrolysis product is isolated by pouring the content of the flask into ice-cold water. The solid thus separated off is filtered and washed in water; 5 g. of crude product are obtained. This product is re-crystallized in diluted alcohol and there are obtained 4.2 g. of a crystalline white solid having its melting point at 197°–198° C.

*Analysis.*—Acidimetric titration: 100.0%.

Example 22

2-ETHYL-3-METHYLCHROMONE-7-OXYACETIC ACID (FIG. 22)

Into a one-pipe 50 cm³ flask, equipped with a bulb cooler, there are introduced 5 g. of 2-ethyl-3-methylchromone-7-ethyl oxyacetate, and 25 cm.³ of $H_2SO_4$ at 70% are added thereto. The mixture is refluxed during two hours, and a clear solution is finally obtained. The hydrolysis product is isolated by pouring the content of the flask into ice-cold water. The solid thus separated off is filtered and washed in water; this yields 3.7 g. of crude product, which are re-crystallized in diluted alcohol. 3.1 g. of a crystalline white solid; having its melting point at 169–171° C. are obtained.

*Analysis.*—Acidimetric titration: 101.0%.

Example 23

FLAVONE-7-OXYACETIC ACID (FIG. 23)

Into a one-pipe 50 cm.³ flask equipped with a bulb cooler there are introduced 2.5 g. of flavone-7-ethyl oxyacetate, and 25 cm.³ of $H_2SO_4$ at 70% are added thereto. The mixture is refluxed for 2 hours, a clear solution is finally obtained and the hydrolysis product is isolated by pouring the content of the flask into ice-cold water. The solid thus separated off is filtered and washed in water; this yields 1.7 g. of crude product. This product is recrystallized in ethylic alcohol or in Carbitol, and there is obtained 0.9 g. of a crystalline white solid having its melting point at 267–269° C.

*Analysis.*—Acidimetric titration: 98.1%.

Example 24

Figure 24:
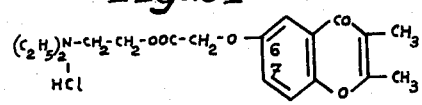

2,3-DIMETHYLCHROMONE-6-BETA-DIETHYLAMINO-ETHYL OXYACETATE HYDROCHLORIDE (FIG. 24)

Into a three-pipe flask of 500 cm.³ equipped with an agitator, a bulb cooler with a $CaCl_2$ trap and a separating funnel, there are introduced 100 cm.³ isopropylic alcohol in which are placed in suspension 3.8 g. of the potassium salt of the 2,3-dimethylchromone-6-oxyacetic acid. Through the separating funnel, there is introduced for 15 minutes a solution of 3 g. of beta-diethylaminoethyl chloride hydrochloride in 50 cm.³ of isopropylic alcohol, while maintaining the suspension at a temperature of 10–15° C. in a running water bath.

Once the addition has been completed, the mixture is refluxed for 5 hours in an oil bath. The mixture is subsequently filtered while hot and the cake collected on the filter is washed with a small quantity of hot isopropylic alcohol. As the filtrate cools down, a solid settles which is then filtered in a Büchner funnel, washed and dried in the autoclave at 100° C. The crude product has a weight of 5 g., it is recrystallized in absolute alcohol, and there are obtained 2.7 g. of a product in the form of a crystalline solid having a white colour, easily soluble in water and having its melting point at 192–193° C.

*Analysis.*—Argentometric titration: 97.9%.

Example 25

2,3-DIMETHYLCHROMONE-6-BETA-PIPERIDINOETHYL OXYACETATE HYDROCHLORIDE

Into a three-pipe flask of 500 cm.³, equipped with an agitator, a bulb cooler with a $CaCl_2$ trap and a separating funnel, there are introduced 100 cm.³ of isopropylic alcohol in which are placed in suspension 5 g. of the potassium salt of the 2,3-dimethylchromone-6-oxyacetic acid. Through the separating funnel, there is introduced for 15 minutes, a solution of 3.6 g. of beta-piperidinoethyl chloride hydrochloride in 50 cm.³ of isopropylic alcohol, while maintaining the suspension at a temperature of 10–15° C. in a running water bath.

Once the addition has been completed, the mixture is refluxed for 5 hours in an oil bath. The mixture is then filtered while hot, the cake on the filter is washed with a small quantity of hot isopropylic alcohol. The filtrate, concentrated to dryness, leaves a solid which is recrystallized in absolute ethylic alcohol, yielding 2.1 g. of crystalline solid having a white colour, which is readily soluble in water and has its melting point at 207–210° C.

*Analysis.*—Argentometric titration: 97.8%.

Example 26

Figure 26:
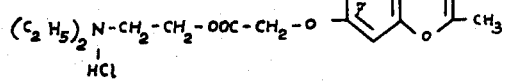
Figure 21:
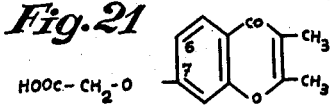
Figure 27:
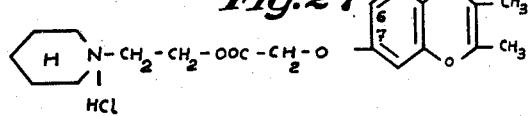
Figure 22:
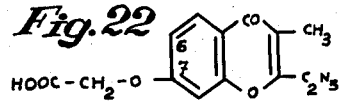
Figure 28:
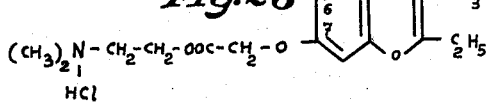
Figure 23:
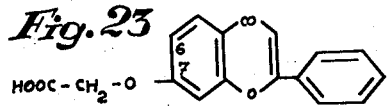

2,3-DIMETHYLCHROMONE-7-BETA-DIETHYLAMINO-ETHYL-OXYACETATE HYDROCHLORIDE (FIG. 26)

Into a three-pipe flask of 500 cm.³, equipped with an agitator, a bulb cooler with a $CaCl_2$ trap and a separating funnel, there are introduced 100 cm.³ of isopropylic alcohol, in which 14.35 g. of potassium salt of 2,3-dimethylchromone-7-oxyacetic acid are placed in suspension. Through the separating funnel, there are introduced during 30 minutes, a solution of 8.6 g. of diethylamino-beta-chlorethane hydrochloride in 150 cm.³ of isopropylic alcohol, while maintaining the suspension at a temperature of 10–15° C. by means of a running water bath.

Once the addition has been completed, the mixture is refluxed for 5 hours in an oil bath. This mixture is then filtered while hot, the cake on the filter is washed with a small quantity of hot isopropylic alcohol. The filtrate, by cooling, allows a solid to settle; this solid is filtered in a Büchner funnel, then washed and dried in the autoclave at 100° C. The crude product weighs 10 g.; it is recrystallized in a fine mixture of alcohol and ether, yielding 7.2 g. of product in the form of a crystalline solid of white colour which is readily soluble in water and has its melting point at 189–191° C.

*Analysis.*—Argentometric titration: 99.3%.

Example 27

2,3-DIMETHYLCHROMONE-7-BETA-PIPERIDINOETHYL-OXYACETATE HYDROCHLORIDE (FIG. 27)

Into a three-pipe flask of 500 cm.³, equipped with an agitator, a bulb cooler with a $CaCl_2$ trap and a separating funnel, there are introduced 150 cm.³ of isopropylic alcohol in which 14.35 g. of potassium salt of 2,3-dimethylchromone-7-oxyacetic acid are in suspension. Through the separating funnel, there is introduced during 30 minutes, a solution of 8.2 g. of beta-chlorethyl-piperidine hydrochloride in 150 cm.³ of isopropylic alcohol, while maintaining the suspension at a temperature of 10–15° C. by means of a running water bath.

Once the addition has been completed, the mixture is refluxed for 5 hours in an oil bath. This mixture is then filtered while hot, the cake on the filter being washed with a small quantity of hot isopropylic alcohol. As it cools down the filtrate allows a solid to settle; this solid is then filtered in a Büchner funnel, washed and dried in the autoclave at 100° C. The crude product weighs 10 g.; it is recrystallized in absolute alcohol, yielding 7 g. of product in the form a crystalline solid of a white colour, easily soluble in water and having its melting point at 189–190° C.

*Analysis.*—Argentometric titration: 100.5%.

Example 28

2-ETHYL-3-METHYLCHROMONE-7-BETA-DIMETHYL-AMINO-ETHYL-OXYACETATE HYDROCHLORIDE

Into a three-pipe flask of 500 cm.³, equipped with an agitator, a bulb cooler with a $CaCl_2$ trap and a separating funnel, there are introduced 100 cm.³ of isopropylic alcohol in which are placed in suspension 9 g. of potassium salt of the 2-ethyl-3-methylchromone-7-oxyacetic acid. Through the separating funnel, there is introduced during 30 minutes, a solution of 8.64 g. of beta-dimethyl-aminoethyl chloride hydrochloride in 200 cm.³ of isopropylic alcohol, while maintaining the suspension at a temperature of 10–15° C. by means of a running water bath.

Once the addition has been completed, the mixture is refluxed during 5 hours, in an oil bath. It is subsequently filtered while hot, the cake on the filter being washed with a small quantity of hot isopropylic alcohol. As it cools down, the filtrate allows a solid to settle; this solid is filtered in a Büchner funnel, then washed and dried in the autoclave at 100° C. The crude product weighs 4 g.; it is recrystallized in absolute alcohol yielding 2 g. of a crystalline solid of white colour, which is readily soluble in water and has its melting point at 195–197° C.

*Analysis.*—Argentometric titration: 98.7%.

Example 29

Figure 29:
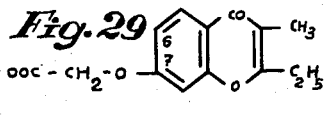

2 - ETHYL - 3 - METHYLCHROMONE - 7 - BETA - DIETHYLAMINOETHYL - OXYACETATE HYDROCHLORIDE (FIG. 29)

Into a three-pipe flask of 500 cm.³, equipped with an agitator, a bulb cooler with a $CaCl_2$ trap, and a separating funnel, there are introduced 100 cm.³ isopropylic alcohol in which are placed in suspension 8.2 g. of potassium salt of 2-ethyl-3-methylchromone-7-oxyacetic acid. Through the separating funnel, there is introduced during 15 minutes, a solution of 4.64 g. of beta-diethylaminoethyl chloride hydrochloride in 150 cm.³ of isopropylic alcohol, while maintaining the suspension at a temperature of 10–15° C. by means of a running water bath.

Once the addition has been completed, the mixture is refluxed for 5 hours, in an oil bath. It is then filtered while hot and the cake on the filter is washed with a small quantity of hot isopropylic alcohol. The filtrate by cooling allows a solid to settle; this solid is filtered in a Büchner funnel, then washed and dried in the autoclave at 100° C. The crude product, which weighs 7 g. is recrystallized in absolute alcohol, yielding 4 g. of a crystalline solid of white colour which is readily soluble in water and has its melting point at 158–161° C.

*Analysis.*—Argentometric titration: 97.5%

Example 30

Figure 30:
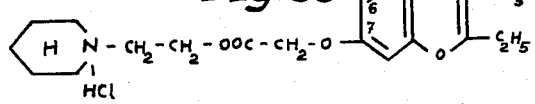
Figure 25:
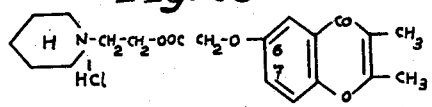
Figure 31:
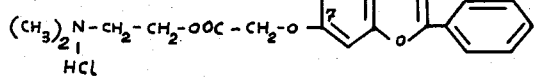
Figure 32:
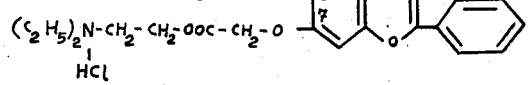
Figure 33:
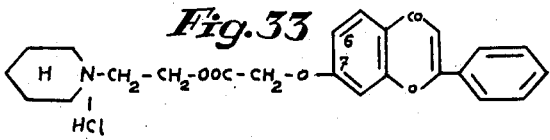

2 - ETHYL - 3 - METHYLCHROMONE - 7 - BETA - PIPERIDINOETHYL-OXYACETATE HYDROCHLORIDE (FIG. 30)

Into a three-pipe flask of 500 cm.³, equipped with an agitator, a bulb cooler with a CaCl₂ trap and a separating funnel, there are introduced 100 cm.³ of isopropylic alcohol, in which are placed in suspension 12 g. of potassium salt of 2-ethyl-3-methylchromone-7-oxyacetic acid. Through the separating funnel, there is introduced during 15 minutes a solution of 7.08 g. of beta-chlorethylpiperidine hydrochloride in 200 cm.³ of isopropylic alcohol, while maintaining the suspension at a temperature of 10–15° C. by means of a running water bath.

Once the addition has been completed, the mixture is refluxed for 5 hours, in an oil bath. It is then filtered while hot, and the cake on the filter is washed with a small quantity of hot isopropylic alcohol. The filtrate, by cooling, allows a solid to settle; this solid is filtered in a Büchner funnel, then it is washed and dried in the autoclave at 100° C.; the crude product, weighing 6 g. is recrystallized in a mixture of alcohol and ether, yielding 5.5 g. of a crystalline solid of white colour, which is readily soluble in water and has its melting point at 190–192° C.

*Analysis.*—Argentometric titration: 98.7%.

Example 31

FLAVONE-7-BETA-DIMETHYLAMINOETHYL-OXYACETATE HYDROCHLORIDE (FIG. 31)

Into a three-pipe flask of 500 cm.³, equipped with an agitator, a bulb cooler with a CaCl₂ trap and a separating funnel, there are introduced 100 cm.³ of isopropylic alcohol in which are placed in suspension 10 g. of sodium salt of flavone-7-oxyacetic acid. Through the separating funnel, there is introduced during 15 minutes a solution of 4.5 g. of beta-dimethylaminoethyl chloride hydrochloride in 100 cm.³ of isopropylic alcohol, while maintaining the suspension at a temperature of 10–15° C. by means of a running water bath. Once the addition has been completed, the mixture is refluxed for 5 hours in an oil bath. It is then filtered while hot and the cake on the filter is washed with a small quantity of hot isopropylic alcohol. The filtrate, by cooling, allows a solid to settle; it is filtered in a Büchner funnel, then it is washed and dried in the autoclave at 100° C.; the crude product, weighing 9 g., is recrystallized in absolute ethylic alcohol, yielding 7 g. of a crystalline solid of white colour, which is readily soluble in water and has its melting point at 175–180° C.

*Analysis.*—Argentometric titration: 97.5%.

Example 32

FLAVONE-7-BETA-DIETHYLAMINOETHYL-OXYACETATE HYDROCHLORIDE (FIG. 32)

Into a three-pipe flask of 500 cm.³, equipped with an agitator, a bulb cooler with a CaCl₂ trap, and a separating funnel, there are introduced 150 cm.³ of isopropylic alcohol, in which are placed in suspension 15.9 g. of sodium salt of flavone-7-oxyacetic acid. Through the separating funnel, there is introduced during 15 minutes a solution of 7.9 g. of beta-diethylaminoethyle-chloride hydrochloride, in 150 cm.³ of isopropylic alcohol, while maintaining the suspension at a temperature of 10–15° C. by means of a running water bath.

Once the addition has been completed, the mixture is refluxed for 5 hours, in an oil bath. It is then filtered while hot and the cake on the filter is washed with a small quantity of hot isopropylic alcohol. The filtrate, by cooling, allows a solid to settle; it is filtered in a Büchner funnel and then washed and dried in the autoclave at 100° C. The crude product weighing 14 g. is recrystallized in absolute ethylic alcohol, yielding 8 g. of crystalline solid of white colour, readily soluble in water and having its melting point at 199–200° C.

*Analysis.*—Argentometric titration: 98.9%.

Example 33

FLAVONE-7-BETA-PIPERIDINOETHYL-OXYACETATE HYDROCHLORIDE (FIG. 33)

Into a three-pipe flask of 500 cm.³, equipped with an agitator, a bulb cooler with a CaCl₂ trap, and a separating funnel, there are introduced 150 cm.³ of isopropylic alcohol in which are placed in suspension 10 g. of sodium salt of flavone-7-oxyacetic acid. Through the separating funnel, there is introduced during 15 minutes, a solution of 5.7 g. of beta-chlorethylpiperidine hydrochloride in 200 cm.³ of isopropylic alcohol, while maintaining the suspension at a temperature of 10–15° C. by means of a running water bath.

Once the addition has been completed, the mixture is refluxed for 5 hours in an oil bath. It is then filtered while hot, the cake on the filter being washed with a small quantity of hot isopropylic alcohol. The filtrate, on cooling, allows a solid to settle; it is filtered in a Büchner funnel then washed and dried in the autoclave at 100° C. The crude product weighing 7 g. is recrystallized in absolute ethylic alcohol, yielding 5 g. of a crystalline solid of white colour, readily soluble in water.

*Analysis.*—Argentometric titration: 97.4%.

What I claim is:
1. A coronaro-dilatory compound having the general formula

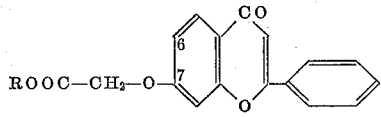

wherein R is selected from the group consisting of:

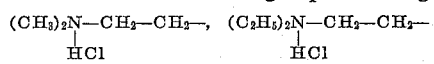

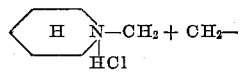

H, Na, K, and an alkyl radical containing 1 to 6 carbon atoms.

2. A coronaro dilatory compound consisting of methyl flavone-7-oxyacetate, having the formula

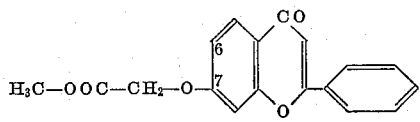

3. A coronaro-dilatatory compound consisting of propyl flavone-7-oxyacetate, having the formula

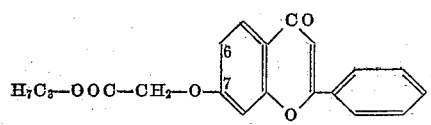

4. A coronaro-dilatatory compound consisting of isopropyl flavone-7-oxyacetate, having the formula

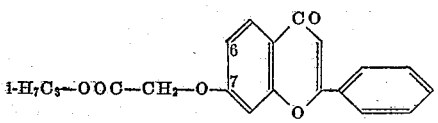

5. A coronaro-dilatatory compound consisting of butyl flavone-7-oxyacetate, having the formula

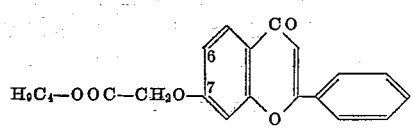

6. A coronaro-dilatatory compound consisting of beta-diethylaminoethyl flavone-7-oxyacetate hydrochloride, having the formula

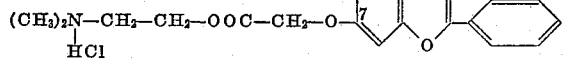

7. A coronary vasodilator consisting of ethyl 7-flavone-oxyacetate having the structural formula

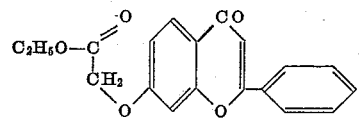

8. A method of producing ethyl 7-flavoneoxyacetate which comprises causing 7-hydroxy-flavone to react with ethyl haloacetate in the presence of an acetone solution of an alkali carbonate at the boiling temperature of said solution until a solid residue is obtained, separating the residue from the solution, purifying it by flushing and recrystallizing it from an alcoholic solution.

References Cited in the file of this patent

Rangaswami et al.: Proc. Indian Acad. Sci., vol. 9A, pp. 259–64 (1939).
Pandit et al.: Chem. Abst., vol. 45, p. 618c (1951).
Hutter et al.: Chem. Rev., vol. 48, p. 559 (1951).